Aug. 1, 1939.  A. H. SCHUTTE  2,168,141
METHOD FOR SEPARATING WAX
Filed May 19, 1938
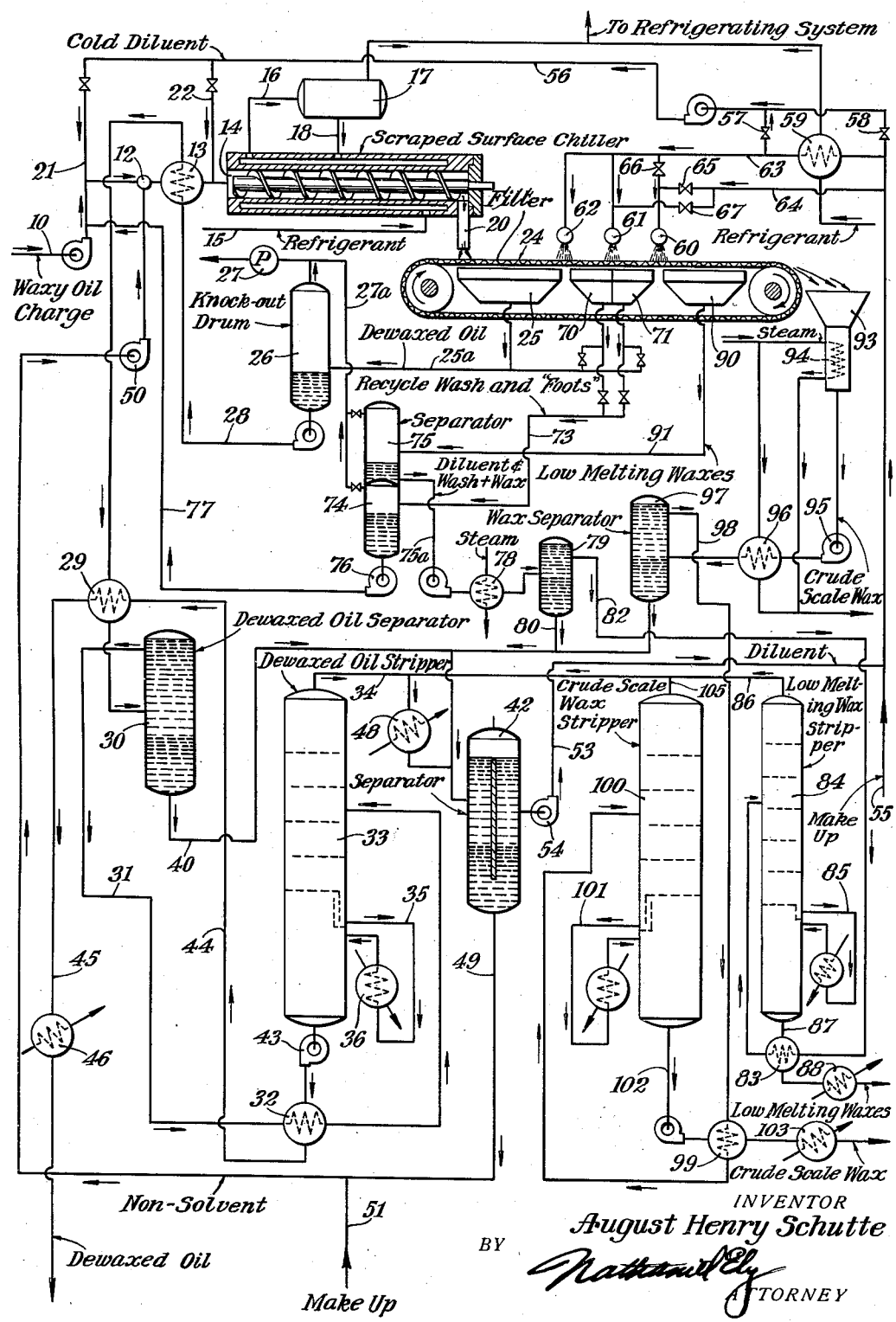
INVENTOR
August Henry Schutte
BY Nathaniel Ely
ATTORNEY Patented Aug. 1, 1939

2,168,141

UNITED STATES PATENT OFFICE 2,168,141

METHOD FOR SEPARATING WAX

August Henry Schutte, Westfield, N. J.

Application May 19, 1938, Serial No. 208,910

7 Claims. (Cl. 196—18)

This invention relates to improvements in the art of dewaxing oils, such as petroleum oils, to reduce the pour point thereof, and is a development on my co-pending application Serial No. 192,534, filed February 25, 1938.

It has heretofore been known that it is possible to remove the wax from oils by chilling to precipitate the wax and then separating the oil from the wax. Various aids have been suggested to facilitate this removal and various solvents having a selective action have also been used. Each method has involved expensive or non-continuous refrigerating and separating apparatus or distillation equipment for solvent recovery and the cost of dewaxing oils is still very high both for utilities and materials used.

My invention has for its particular object an improvement in the separation of oil and wax for recovery of the oil or wax or both in which the separation will be less costly, equally as quick or quicker than heretofore used processes, and which will have no detrimental effect on the oil. Costly or toxic selective solvents are entirely unnecessary, and separation can be accomplished by simple filtration and with minimum loss of either wax or oil.

Another object of the invention is to simultaneously treat the wax cake so that further sweating is unnecessary, the treatment including washing of the filter cake at controlled, progressively increasing temperatures so that different melting point wax cuts can be produced during the oil recovery.

The underlying basis of my invention is my discovery that if wax-bearing oils are suitably mixed with a non-solvent material and emulsified, and the emulsion chilled to a suitable temperature that the resulting material is freely filterable with a high efficiency of wax-oil separation. While various non-solvents have been tried, I find that of these, two classes are important, viz., those that freeze or crystallize at substantially the pour point of the charge oil, or slightly below, and those that do not freeze in the range of chilling temperatures used to remove the wax.

It appears that in the emulsion, the oil is largely in the form of a surface film, or interface between oil and non-solvent. In such a mass the surface tension effects must be quite different from those generally obtained in waxy oil or waxy oil solutions in solvents. If the oil being treated contains amorphous waxes, this effect is combined with that of providing crystal nuclei by chilling below the freezing point of the finely dispersed non-solvent. The result is that the waxes are easily retained on a filtering medium and the oils pass through the cake so deposited. Without emulsification in non-solvent, the oil and amorphous waxes both pass through the filter. The viscosity of heavy oils is decreased to allow filtration in adding a "thinner" or diluent such as ordinary naphtha. The use of either freezing or non-freezing non-solvents with crystalline wax containing oils increases the filter rates and increases the yield of wax free oil, but I prefer to use the non-freezing non-solvents as there is no need of crystallizing the non-solvent in this case, and it requires less refrigeration if the heat of fusion need not be removed from the non-solvent. Furthermore, the volume of the filter cake is less.

The more specific objects and advantages of my invention, together with a description of a preferred manner of carrying out the invention will appear hereinafter and in connection with the attached drawing which is a diagrammatic layout of dewaxing apparatus in accordance with a preferred form of embodiment of the invention.

In accordance with this preferred form of my invention, the wax bearing oil charge 10 is initially pumped through a suitable mixing chamber or valve 12 where it is intimately mixed with the desired quantity of a non-solvent such as water, brine, alcohols, etc., and sufficient diluent may be added to lower its viscosity so that it is filterable at the chilling temperature. This diluent may be any light oil-soluble liquid such as ordinary naphtha. The mixing device 12 may be of any desired type which gives an intimate mixture of the oil and non-solvent, and such mixture is in the nature of an emulsion. The intimacy of mix is such that the oil is finely dispersed and has a high ratio of surface area which is important as hereinafter described.

The mixed oil and non-solvent is then passed through a cooler 13 for a substantial reduction in temperature, after which the chilled mixture is discharged into a continuous chiller 14. This chiller may be of the scraped surface type and is preferably provided with a continuous spiral for carrying the chilled mixture in heat exchange relation with the cooled walls which are suitably refrigerated by a refrigerant entering at 15. The refrigerant discharges at 16 into the receiver 17, from which there may be a return circulation through the line 18 to take full advantage of the cooling effect therein. The spent refrigerant is suitably returned to the refrigerating system as is well known.

The chilled oil-wax-non-solvent mixture discharges from the chiller 16 at 20, and depending upon the amount of non-solvent liquid added at the mixing valve 12, it will be either a slurry or a snow-like mass. For the purpose of this disclosure the amount of non-solvent will be considered to be equal to the volume of the wax which is to be removed from the oil. The slurry that is discharged at 20 is therefore of a sherbet-like consistency which is very readily filtered or separated on the continuous filter 24.

The filter 24 is shown to be of the Fourdrinier type, although it is to be understood that it may be of any other suitable type such as a centrifugal vacuum or pressure filter and of the disk or drum type, which has a suitable filter surface through which the oil may be filtered. If a filter of the Fourdrinier type is used, it will be provided with suitable suction boxes to collect the filtrate.

The nature of the filtrate in the various suction boxes varies in accordance with the desired operating procedure. Assuming, for example, that the wax bearing oil is a high-viscosity cylinder stock which normally carries amorphous wax or petrolatum, I find it desirable to add the diluent at 21 or 22 and to use a non-solvent that will crystallize in the temperature range of the dewaxing. Water is eminently suited to this purpose.

If the wax bearing oil is a heavy neutral, the wax is usually in crystalline form and the non-solvent with which it is to be emulsified need not be a crystallizing type as heretofore pointed out. The free flowing intimate mixture is readily formed and the crystalline nature of the wax is sufficient for adequate filtration rates. It may be necessary to use a diluent, however, and any one is sufficient if it reduces the viscosity so that the chilled mixture can be handled. Naphtha is recommended because of its low cost and high effectiveness. With low viscosity oils having crystalline wax, such as Diesel oils, diluents are unnecessary.

When using the diluent, it may be introduced at 21, and preferably, is of low enough temperature to accomplish a direct chilling of the oil. This materially reduces the duty on the cooler 13 and chiller 14. It will be appreciated that the diluent inlets 21 and 22 are separately controlled to provide diluent either before or after the mixing device 12 so that the oil may be treated in any desired condition.

In the present embodiment of my invention, with oils containing crystalline wax, the first suction box 25 will receive a dewaxed oil and non-solvent which is withdrawn into the air knock-out drum 26, suitably maintained under a vacuum by the pump 27. The oil is then pumped out through the line 28, through the cooler 13 and then through the heat exchanger 29 into the dewaxed oil separator 30 in which the oil is separated from any non-solvent.

The non-solvent which separates from the oil in the dewaxed oil separator 30, is removed at 40 for further treatment in the separator 42 which will be hereinafter described. The oil is removed at 31, passed through heat exchanger 32 and introduced into the dewaxed oil stripper 33. Heat is supplied in any desired manner as by the reboiling circuit 35, including heat exchanger 36 and the diluent vapors go off overhead at 34. The wax-free and dry oil is removed from the dewaxed oil stripper 33 by pump 43 and pumped through the heat exchanger 32, thence through the line 44, the heat exchanger 29, and is discharged as an end product in the line 45 preferably passing through a subsequent cooler 46.

The separator 42 is adapted to receive any non-solvent decanted in the oil separator 30 through the line 40 and the diluent vapors which are removed from the dewaxed oil stripper 33 through the line 34, such diluent vapors being condensed at 48. The separator 42 thus acts as a decanting vessel with the non-solvent liquid collecting at the bottom and removed at 49, such liquid being pumped by the pump 50 as needed into the mixing chamber 12. Suitable make-up is provided at 51 if necessary.

The upper layer of liquid in the separator 42 will be the diluent which may be removed through the line 53 by pump 54. Make-up may be added at 55, and is then pumped along the line 56 to supply the cool diluent required at 21 and 22 as needed. The valves 57 and 58 around the cooler 59 provide for proportioning the amount of warm and cool diluent for the desired temperature control at these points.

The diluent may also be used for wash purposes and be discharged through the respective nozzles 60, 61 and 62, which are fed by the diluent lines 63 and 64 having valves 65, 66 and 67, also for the purpose of controlling the temperature of the wash liquid. It will be seen that by proportioning the amount of diluent that passes around the cooler 59, it will be possible to precisely determine the temperature of the wash material.

By washing the wax filter cake at different temperatures, I am able to obtain different melting point waxes at the same time as the wax separation takes place. I prefer to operate the wash nozzle 61 at the lowest temperature which may be in the range of approximately 10° F. above the chilling temperature and to operate the wash nozzle 60 at a somewhat higher temperature, perhaps 20° F. above the chilling temperature, depending upon the type of oil and the nature of the wax. Different melting point wax cuts are then drawn into the suction boxes 71 and 90.

In the non-solvent emulsion the wax is in finely divided particles which cannot agglomerate, due to the presence of the non-oily material. The formation of a dense wax crystal structure is prevented and the filtration of the oil and low melting point waxes is thus greatly accelerated. Since each particle was surrounded by non-solvent in the original emulsion, the subsequent washing with warm non-solvent for melting and displacing the lower melting constituents is readily effected at high filter rates. The presence of the wax in fine particles assures rapid and uniform temperature equilibrium with the wash liquid.

A part or all of either of the respective cuts in suction boxes 70 and 71 are also withdrawn through the "foots" line 73 and recycled with the incoming charge oil 10. This may be accomplished by passing the "foots" oil into a separator chamber 74 which is interconnected with the vacuum pump 27, through the line 27a. The "foots" oil is then drawn off through the line 77 and returned to the charge oil 10. No recovery of this wash is necessary and considerable heat losses can be avoided.

The filtrate entering the suction box 90 is drawn off through the line 91. This filtrate is a relatively low melting point wax. It is drawn into the upper chamber 75 under vacuum of line 27a, and is removed at 75a, heated at 78 and the wax allowed to separate from the wash liquid in separator 79. The wax is then removed through line 82, heated at 83 and passed into low melting wax stripping column 84. This column is maintained at the desired temperature as by reboiling circuit 85. The diluent vapors are removed through line 86 and also condensed at 48 and separated in the separator 42. The bottoms product from the stripping column 84 is removed at 87, passed through heat exchangers 83 and 88, and collected as low melting point wax.

The filter cake from the filter 24 is the crystalline mass of high melt wax and non-solvent and is discharged into the hopper 93 which may be provided with a suitably heated coil 94 to liquefy the mixture. This is then discharged under pressure by the pump 95 through heat exchanger 96 into the wax separator 97. The crude scale wax can be decanted through the line 98 and is suitably heated in the heat exchanger 99 and introduced into the crude scale wax stripper 100. This distilling column is also suitably heated as by reboiling circuit 101 and any diluent vapor carried by the wax is removed through line 105 which connects with condenser 48. The bottoms product removed at 102 from the crude scale wax stripper is passed through the heat exchanger 99 and heat exchanger 103 and is the crude scale wax as an end product.

If lighter neutral oils are to be treated, diluents are not necessary and a large part of the apparatus required for diluent recovery can be eliminated. It is to be noted, however, that it is possible in any case, not only to freely separate out a slack wax from a suitable wax-oil mixture, but it is also possible to simultaneously treat such wax while it is still on the filter. The controlled temperature washes readily affect the different melting point waxes and wax separation can be accomplished without delay and with substantially sharp separation. If aded cuts are desired, modifications of the apparatus for multiple washes can be made.

It has heretofore been suggested that naphtha is preferred as a wash liquid and in many cases, this is correct. It is also possible in many cases, however, to use the non-solvent selected or a similar one for this purpose, and thereby obtain all the benefits without the problems solvent recovery requires. Washing with non-solvent is preferably carried out at temperatures slightly higher than the refrigerating temperatures, whereas due to the solvent nature of washes of naphtha and the like, lower wash temperatures should be used to prevent refrigeration losses and too great a dilution of materials and brings down intermediate melting point waxes.

The emulsification of the oil with the non-solvent is preferably carried out at temperatures in the range of the pour point of the oil so that the mixture will remain stable until it can be chilled. The filtration is such, however, that there is no difficulty in separating the wax and oil and in future steps, the separation of non-solvent from wax or oil. In this latter case, gravity separation as illustrated in separator tanks 79, 97, 30 and 47, is preferred to other methods of separation in view of the ease and economy of such a process. Such ready separation, greatly reduces costs by making heat and distillation apparatus unnecessary.

While I have shown and described preferred forms of embodiment of my invention, I am aware that other modifications may be made thereto and I therefore desire a broad interpretation of my invention within the scope and spirit of the description herein and of the claims appended hereinafter.

I claim:

1. The method of dewaxing oils and recovering different melting point waxes, which comprises the steps of emulsifying the oil with a non-solvent liquid, chilling the emulsion, filtering the emulsion to separate the wax from the oil, and washing the wax while in the dispersed condition at controlled temperatures to obtain different melting point products of substantially oil free nature.

2. The method of recovering wax from waxy oil mixtures and obtaining wax free oil which comprises the steps of emulsifying the waxy oil mixture with a non-solvent liquid, chilling the mixture, separating wax from the wax free oil from the mixture while still maintaining the mixture in emulsified form, washing the wax while in the dispersed condition at controlled temperatures, separating different melting point waxes from the remainder of the mixture, drying the wax free oil, separately drying certain of the different melting point waxes, and recycling other different melting point waxes.

3. The method of recovering wax from waxy oil mixtures and obtaining wax free oil which comprises the steps of adding a diluent to reduce the viscosity of the oil, emulsifying the waxy oil mixture with a non-solvent liquid, chilling the emulsion, separating wax free oil from the emulsion, washing the remaining wax at controlled temperatures, separating different melting point waxes from the remainder of the emulsion, drying the wax free oil, separately drying certain of the different melting point waxes, and recycling other different melting point waxes to produce substantial yields of high melting point wax.

4. The method of continuously dewaxing a crystalline wax containing oil and obtaining different melting point fractions of wax which comprises the steps of emulsifying the wax with a non-freezing non-solvent liquid, chilling said emulsion, filtering said emulsion, washing said emulsion at progressively increasing temperatures, and removing a high melting point wax as the filter cake, a dewaxed oil as a first filtrate, and an intermediate melting point wax as a second filtrate.

5. The method of continuously dewaxing a crystalline wax containing oil and obtaining different melting point fractions of wax which comprises the steps of emulsifying the wax with a non-freezing, non-solvent liquid, chilling said emulsion, filtering said emulsion, washing said emulsion at progressively increasing temperatures and removing a high melting point wax as the filter cake, a dewaxed oil as a first filtrate, and intermediate melting point waxes as subsequent filtrates, part of said intermediate waxes and wash material being subsequently recycled to yield a low melting point wax and a high yield of high melting point wax.

6. The method of dewaxing a wax-bearing oil to remove the amorphous wax therein which comprises emulsifying the oil with a substantially non-solvent, non-reactive liquid having a crystal formation when frozen, chilling the emulsion to such a low temperature as to crystallize the non-solvent liquid and to precipitate the wax, and separating the oil from the amorphous wax and non-solvent precipitate.

7. The method of dewaxing high viscosity cylinder oils of amorphous wax which comprises the steps of diluting the oil, emulsifying the oil with water, chilling the emulsion to precipitate the wax and crystallize the water, filtering the wax free oil and recovering the diluent.

AUGUST HENRY SCHUTTE.